United States Patent [19]

Asami

[11] 3,921,215

[45] Nov. 18, 1975

[54] MAGNETIC RECORDING AND REPRODUCING SYSTEM WITH TAPE COUNTER

[75] Inventor: Etsuji Asami, Hirakata, Japan

[73] Assignee: Matsushita Electric Industrial Co., Ltd., Osaka, Japan

[22] Filed: June 24, 1974

[21] Appl. No.: 482,583

[30] Foreign Application Priority Data

June 28, 1973 Japan ............................... 48-73471
July 4, 1973 Japan ............................... 48-76054

[52] U.S. Cl. ...................... 360/74; 360/71; 360/93; 360/137

[51] Int. Cl.[2] .................. G11B 15/18; G11B 15/44; G11B 15/50

[58] Field of Search ............. 360/74, 71, 72, 12–13, 360/90, 83, 93–96, 137; 352/170, 172; 242/197–200

[56] References Cited

UNITED STATES PATENTS

| | | | |
|---|---|---|---|
| 2,779,826 | 1/1957 | Scott | 360/137 |
| 3,109,898 | 11/1963 | Gray | 360/74 |
| 3,541,271 | 11/1970 | Joslow et al. | 360/71 |
| 3,770,281 | 11/1973 | Walburn | 360/137 |
| 3,821,816 | 6/1974 | Habelt | 360/137 |

*Primary Examiner*—Alfred H. Eddleman
*Attorney, Agent, or Firm*—Stevens, Davis, Miller & Mosher

[57] ABSTRACT

There is provided a magnetic recording and reproducing system comprising a tape counter for counting the tape progress, means for starting the tape rewind operation in the mid course or at the end of the playback operation by operating a rewind lever, means for stopping the rewind operation when the display of the tape counter becomes a predetermined value, means for starting the rewind or fast feed operation in the mid course of the playback operation without rendering the playback lever inoperative by operating the rewind lever or a fast feed lever, and means for resuming the playback operation when the rewind or fast feed lever is restored or rendered inoperative.

7 Claims, 19 Drawing Figures

MAGNETIC RECORDING AND REPRODUCING SYSTEM WITH TAPE COUNTER

This invention relates to magnetic recording and reproducing systems.

Magnetic recording and reproducing systems, in which the tape rewind operation started after the end of the playback operation is automatically stopped when the tape is rewound up to a predetermined position, are well known in the art. In such systems, however, a playback knob has to be always manipulated for resuming the playback operation, and this manipulation has been rather cumbersome.

The present invention aims to obviate this shortcoming in operability.

An object of the invention is to permit the tape drive motor to be automatically stopped at the time of the rewind operation by using a tape counter.

Another object of the invention is to permit the switching of the playback operation over to the rewind operation without retreating the playback lever and automatic resumption of the playback operation when the rewind operation is stopped.

According to the invention, a magnetic recording and reproducing system, which is very advantageous for repeating the playback of a part of the record, can be realized by merely incorporating a simple construction.

The above and further objects, features and advantages of the invention will become more apparent from the following description taken in conjunction with the accompanying drawings, in which:

FIG. 1 is a top view of an embodiment of the magnetic recording and reproducing system according to the invention;

FIGS. 2*a* and 2*b* are respectively fragmentary front and end views of a tape counter used in the same system;

Figure 10A:
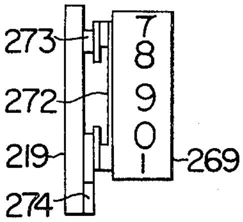
Figure 10B:
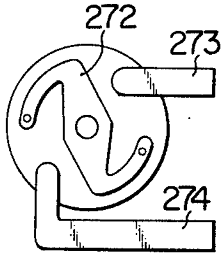

FIGS. 10*a* and 10*b* are respectively fragmentary front and end views of a tape counter used in the same system; and FIGS. 11 to 17 illustrate the function of the same system.

An embodiment of the magnetic recording and reproducing system according to the invention will now be described with reference to FIGS. 1 to 3.

Figure 1:
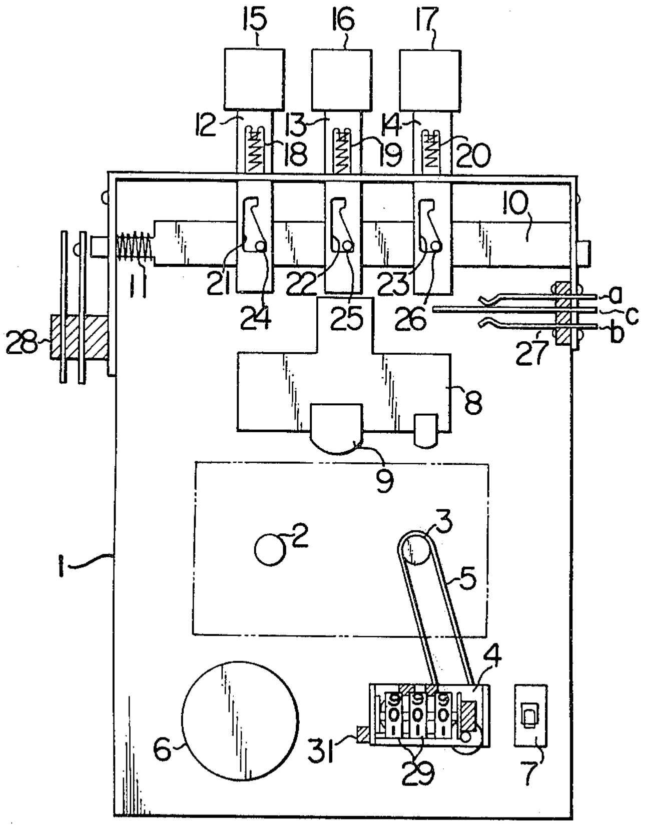

FIG. 1 is a top view of an embodiment of the magnetic recording and reproducing system according to the invention. In the Figure, numeral 1 designates a chassis, and numerals 2 and 3 reel shafts. Numeral 4 designates a tape counter coupled by an endless belt 5 to the reel shaft 3. Numeral 6 designates a motor, numeral 7 a manual switch, and numeral 8 a head base mounted on the chassis 1 for displacement relative thereto in forward and rearward directions. Numeral 10 designates a slidable plate mounted on the chassis 1 for displacement relative thereto in leftward and rightward directions. The slidable plate 10 is biased by a spring 11 in the rightward direction. Fast feed, playback and rewind knob levers 12, 13 and 14 are mounted such that they are slidable in the frontward and rearward directions with respect to the chassis 1. These levers are provided with respective fast feed, playback and rewind knobs 15, 16 and 17. They are also provided with respective bias springs 18, 19 and 20 and are biased thereby in the retreating direction. They are formed at their portion corresponding to the slidable plate 10 with respective openings 21, 22 and 23. Pins 24, 25 and 26 erected from the slidable plate 10 extend through the respective openings 21, 22 and 23. Numeral 27 designates a selection switch, whose movable contact *c* is switched between fixed contacts *a* and *b* by the rewind knob lever 14. Numeral 28 designates a switch, which faces an end of the slidable plate 10 such that it is closed when the slidable plate 10 is displaced in the leftward direction. Each of the openings 21, 22 and 23 formed in the respective knob levers 12, 13 and 14 is shaped such that by advancing the associated knob lever 12, 13 or 14 against the restoring force of the spring 18, 19 or 20 the associated pin 24, 25 or 26 is urged by its slanted edge to move the slidable plate 10 against the force of the spring 11 and that it has a stepped portion to lock the associated pin 24, 25 or 26 so as to lock the associated knob lever 12, 13 or 14 against the force of the spring 18, 19 or 20 and also the slidable plate 10 against the force of the spring 11.

Figure 2A:
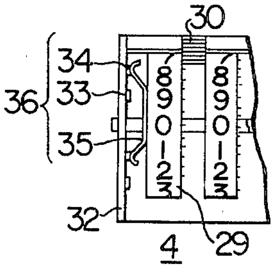
Figure 2B:
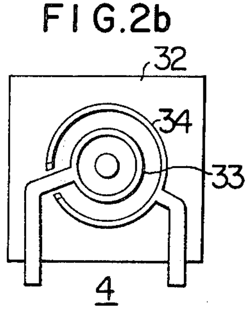

The tape counter 4 may be of a well-known construction as shown in FIGS. 2*a* and 2*b*, comprising a plurality of drums 29 each bearing display figures 0 to 9 arranged over the drum periphery, a drive mechanism for driving the drums 29 at successively reduced speeds and a zero resetting mechanism 31 for momentarily returning all the drums to the position to display 0. An inner end wall 33 of the case of the tape counter 4 is provided with a ring-shaped conductor 33 and an arcular conductor 34 concentric therewith. These conductors 33 and 34 are in frictional contact with opposite ends of a contact piece 35 provided on the corresponding side of the drum 29 facing them. The conductors 33 and 34 and the contact piece 35 form a switch 36 which is turned off when the tape counter 4 comes up with the display of a predetermined value. In the instant embodiment, the switch 36 is adapted to be opened when all the drums 29 of the tape counter 4 come to display 9.

Figure 3:
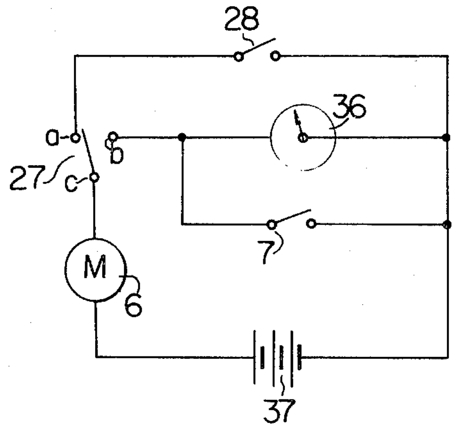
FIG. 3 is a circuit diagram showing part of the electric circuit in the same system.

FIG. 3 shows part of the electric circuit in this embodiment of the magnetic recording and reproducing system. As is shown, one side of a power supply is connected through the afore-mentioned motor 6 to the movable contact *c* of the selection switch 27, and the fixed contact *a* of the selection switch 27 is connected through the switch 28 to the other side of the power supply 37. The other fixed contact *b* of the selection switch 27 is connected through a parallel circuit consisting of the switch 36 and the manual switch 7 to the afore-said other side of the power supply 37.

In the above embodiment, the movable contact *c* of the selection switch 27 is normally connected to the fixed contact *a*. If in this state the fast feed knob 15 or playback knob 16 is pushed to move the knob lever 12 or 13 against the force of the spring 18 or 19, the slidable plate 10 is displaced in the leftward direction against the force of the spring 11, thus closing the switch 28 to cause current to pass through the motor 8, whereby the fast feed or playback operation can be obtained.

Now, if the rewind knob 17 is pushed to move the knob lever 14 against the force of the spring 20, the tip of the knob lever 14 engages the movable contact *c* of the selection switch 27 and switches it into contact with the fixed contact *b*. In this state, the current through the motor 6 flows through the selection switch 27 and the switch 36, so that the rewind operation is automatically stopped when all the drums of the tape counter 4 come to display 9. Before all the drums of the tape counter 4 come to display 9, the switch 36 is on, so that the motor 6 carries predetermined current for the rewind operation. As the rewind operation continues, the display on the tape counter 4 is progressively shifted to smaller values and ultimately becomes all 0's, and in the next step it is shifted to all 9's, whereupon the switch 36 is opened to interrupt the current supplied to the motor 6, thus stopping the rewind operation.

If it is desired to resume the playback operation after the stopping of the rewind operation, it is only necessary to move the playback knob lever 13 against the force of the spring 19 by pushing the knob 16. By simply doing so, the playback operation can be started. With the movement of the playback knob lever 13 against the force of the spring 19 by pushing the knob 16, the slanted edge of the opening 22 urges the pin 25 to cause the leftward displacement of the slidable plate 10. As a result, the locking of the rewind knob lever 14 is released, whereby the movable contact *c* of the selection switch 27 is again thrown to the side of the fixed contact a. Concurrently, the switch 28 is closed, thus causing current to be supplied to the motor. In this way, the playback operation is started.

The switch 7 is used when it is intended to obtain the rewind operation irrespective of the display of the tape counter 4. If the switch 7 is held "on," the rewind operation will not be stopped even when the display of the tape counter 4 becomes all 9's.

As has been shown, in the instant embodiment a selection switch whose movable contact is normally connected to one fixed contact side and is switched to the other fixed contact side only when obtaining the rewind operation, a switch which is connected to the afore-said one fixed contact side of the selection switch and closed only when obtaining the playback operation and a further switch which is connected to the afore-said other fixed contact side of the selection switch and opened only when the tape counter display becomes a predetermined value are provided for supplying power to the motor through these switches. Thus, at the time of the rewind operation the motor can be automatically stopped according to the display of the tape counter. Also, the rewind state can be directly switched over to the playback state without the need of operating any stop knob before operating the playback knob but by merely operating the sole playback knob. Further, the construction is very simple and economical since it is obtained by merely adding one selection switch and two other switches.

Figure 4:
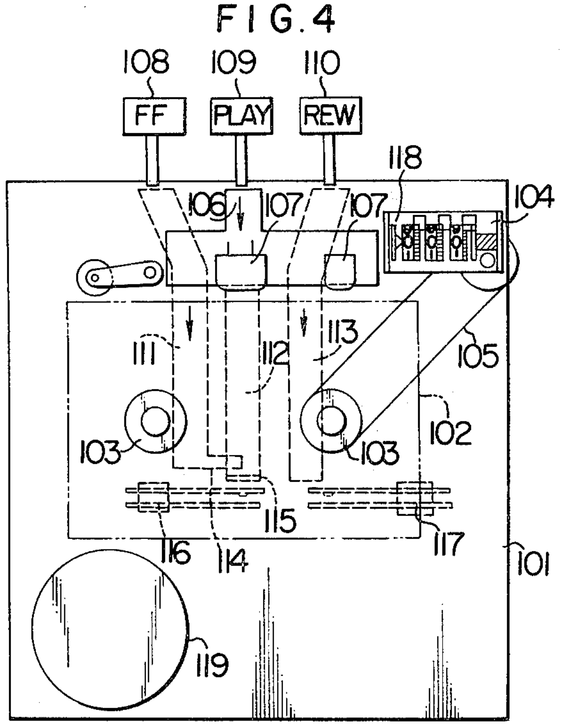
FIG. 4 is a top view of another embodiment of the magnetic recording and reproducing system according to the invention.

Another embodiment of the magnetic recording and reproducing system according to the invention will now be discussed with reference to FIGS. 4 to 6. In the Figures, numeral 101 designates a chassis, numeral 102 a cassette holder provided on the chassis 101, and numeral 103 a reel shaft mounted in the chassis 101. Numeral 104 designates a tape counter, which is coupled by an endless belt 105 to the reel shaft 103. Numeral 106 designates a head base mounted on the chassis 101 such that it can be displaced in a direction parallel to the principal surface of the chassis 101. The head base 106 carries a head 107 mounted unit. Numerals 111, 112 and 113 respectively designate levers slidable on the longitudinal direction by the operation of fast feed, playback and rewind knobs 108, 109, 110, which may be operated for displacing respective levers 111, 112 and 113 in the longitudinal direction. The levers 111 and 112 have respective bent tip portions 114 and 115 which are engageable with each other. Numeral 116 designates a first switch on-off operated with the movement of the levers 111 and 112, numeral 117 a second switch on-off operated with the movement of the lever 113, and numeral 118 a third switch which is provided on the tape counter 104 and adapted to be opened when the display of the tape counter 104 reaches a predetermined value. The third switch 118 has the same construction and function as the switch 36 provided on the tape counter 4 shown in FIGS. 2a and 2b.

Figure 5:
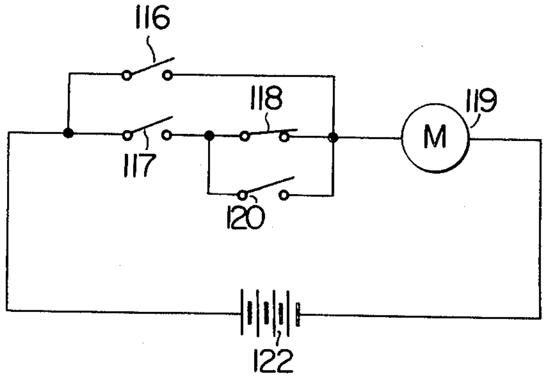
FIGS. 5 and 6 are circuit diagrams showing examples of part of the electric circuit in the same system.
Figure 6:
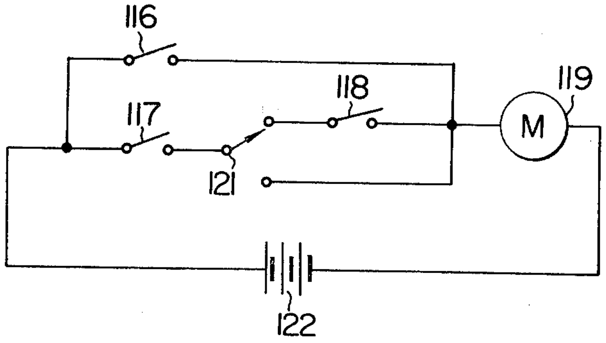
Figure 7:
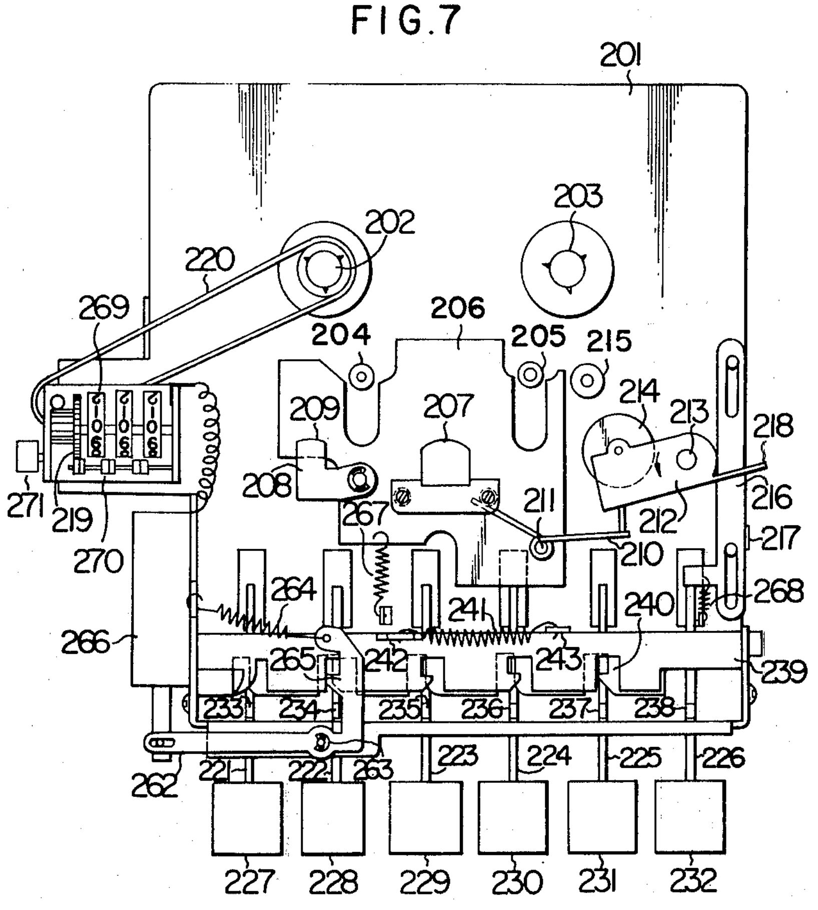
FIG. 7 is a top view of a further embodiment of the magnetic recording and reproducing system according to the invention.
Figure 8:
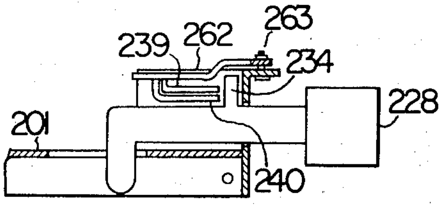
FIG. 8 is a sectional view of part of the same system.
Figure 9:
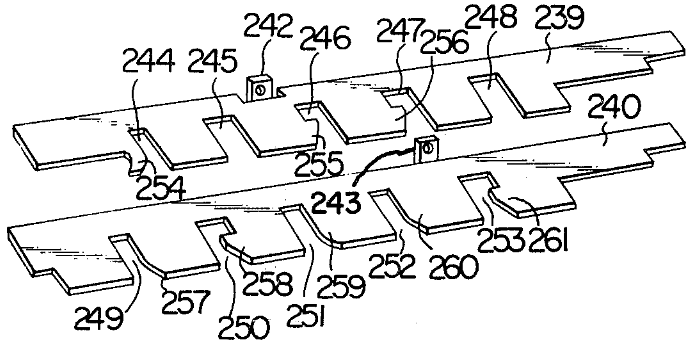
FIG. 9 is an exploded perspective view of part of the same system.

FIGS. 5 and 6 show examples of the electric circuit of this system including the first, second and third switches 116, 117 and 118. The second and third switches 117 and 118 are connected in series, and this series circuit is connected in parallel with the first switch 116. Also, all these switches 116, 117 and 118 are in series with a tape drive motor 119, and this series circuit is connected across a power supply 122. Numerals 120 and 121 designate manual switches, which are provided to permit the third switch 118 to be short-circuited if desired.

With the above construction, by pushing the playback knob 109 the head base 106 is displaced in the direction of arrow. At this time, the heads 107 are also displaced in unison and are brought into contact with the tape. Simultaneously, the first switch 116 is closed since the lever 112 is also displaced in the direction of arrow. Thus, the motor 119 is started to start the playback operation. By pushing the fast feed knob 108 the lever 111 is displaced in the direction of the arrow, with its bent tip portion 114 urging the bent tip portion 115 of the lever 112 to displace the lever 112 in the direction of the arrow. Thus, again in this case the first switch 116 is closed to start the motor 119 for starting the fast feed operation.

When the rewind knob 110 is pushed, the lever 113 is displaced in the direction of the arrow to close the second switch 117. If the third switch 118 is "on" at this time, the source voltage is applied through the second and third switches 117 and 118 to the motor 119 to start the motor 119 for starting the rewind operation. As the rewind operation continues, the numeral display of the tape counter 104 is progressively shifted to smaller values, and upon reaching a predetermined value the third switch 118 is automatically opened to stop the supply of power to the motor 119. In this way, in the rewind state the motor 119 is automatically stopped as soon as a predetermined value is displayed by the tape counter 104.

The tape counter 104 operates even in the playback or fast feed state, with the third switch 118 being opened as soon as a predetermined value is displayed. In this case, however, the first switch 116 is "on," and the motor 119 is not controlled by the third switch 118, which is parallel with the first switch 116. Thus, the motor 119 will not be stopped unless the first switch 116 is opened.

As has been shown, in this embodiment the first switch adapted to be closed by operating the playback knob is connected in parallel with the series circuit consisting of the second switch adapted to be closed by operating the rewind knob and the third switch adapted to be opened only when a predetermined value is displayed by the tape counter. Thus, in the playback state the tape drive motor may be operated independently of the tape counter. Also, only in case of the rewind state the tape drive motor can be automatically rendered inoperative according to the display of the tape counter.

The manual switch 120 in parallel with the third switch 118 which is adapted to be opened when a predetermined value is displayed by the tape counter 104, or the switch 121 provided for disconnecting the third switch 118 from the circuit is used for driving the tape drive motor 119 irrespective of the display of the tape counter 104 even in the rewind state.

A further embodiment of the magnetic recording and reproducing system according to the invention will now be described with reference to FIGS. 7 to 10. In these Figures, numeral 201 designates a chassis. Numerals 202 and 203 designate reel shafts mounted in the chassis 201, numerals 204 and 205 positioning pins erected from the chassis 201, and numeral 206 a head base movable over the chassis 201 in forward and rearward directions. The head base 206 carries a recording and reproducing head 207 mounted on it. An eraser head holder 208 is pivoted at its one end to the head base 206 and has an eraser head 209 provided at its other end. Numeral 210 designates a spring for urging a pinch roller, and its central portion is fitted on a pin 211 erected from the head base 206. A pinch roller holder 212 is pivotally mounted at one end on a pin 213 erected from the chassis 201 and is always biased in the direction of the arrow, and it carries a pinch roller 214 rotatably mounted on its other end portion. Numeral 215 designates a capstan. Numeral 216 designates a temporary stop lever slidable over the chassis 201 in the forward and rearward directions. The temporary stop lever 216 has a protuberance 217, which is adapted to engage with a tongue 218 extending from the pinch roller holder 212 and rotate the holder in the direction of arrow when the lever 216 is moved in the forward direction. Numeral 219 designates a tape counter mounted on an edge portion of the chassis 201. The tape counter 219 is coupled to the reel shaft 202 by an endless belt 220. Stop, rewind, recording, playback, fast feed and temporary stop knob levers 221 to 226 are provided slidably with respect to the chassis 201 in the forward and rearward directions. These levers have their respective integral knobs 227 to 232, and also they have respective integral protuberances 233 to 238 provided at an intermediate portion thereof. Slide members 239 and 240 are slidable with respect to the chassis 201 in the leftward and rightward directions. These slide members 239 and 240 are coupled together by a spring 241 connected at the opposite ends thereof to their respective bent projections 242 and 243. As is most clearly shown in FIG. 9, the slide members 239 and 240 are formed with respective notches 244 to 248 and 249 to 253 which respectively face the protuberances 233 to 237. The slide member 239 is also formed adjacent to the notch 244 with a projection 254 such that it may be moved against the force of the spring 241 when the knob lever 221 is forwardly moved. It is further formed adjacent to the notches 246 and 247 with respective hooking projections 255 and 256. When the knob lever 223 or 224 is forwardly moved, the slide member 239 is adapted to be moved against the force of the spring 241 and then caused to return to its position to hook the protuberance 235 or 236 of the knob lever 223 or 224. The other slide member 240 is also formed adjacent to the notches 249, 251 and 252 with respective projections 257, 259 and 260 such that it may be moved against the force of the spring 241 with the forward movement of the knob levers 221, 223 and 224. It is further formed adjacent to the notches 250 and 253 with respective hooking projections 258 and 261 such that when the knob lever 222 or 225 is forwardly moved it is moved against the force of the spring 241 and then caused to return to its initial position to hook the protuberance 234 or 237 of the knob lever 222 or 225. An L-shaped rotative lever 262 is pivoted at its central portion by pin 263 to the chassis 201, as most clearly shown in FIG. 8. It is spring biased in a predetermined direction by a spring 264, and it has a hook projection 265 provided at a location corresponding to the afore-mentioned notch 245 of the slide member 239. When the knob lever 222 is forwardly moved, the protuberance 234 of the knob lever 222 is adapted to engage the hook projection 265 of the rotative lever 262 and rotate the lever 262 against the force of the spring 264 and then release the lever 262, causing the lever 262 to return to its initial position to thereby hook the protuberance 234. Numeral 266 designates a plunger for rotating the rotative lever 262 against the force of the spring 264.

The head base 206 and temporary stop lever 216 are biased by respective tension springs 267 and 268 and are held in engagement with the respective playback and temporary stop knob levers 224 and 226. The tape counter 219 comprises a plurality of drums 269 each bearing display figures 0 to 9 arranged over the drum periphery, a drive mechanism for driving the drums 269 at successively reduced speeds and a zero resetting mechanism 271 for momentarily returning all the drums to their preset positions. As shown in FIGS. 10*a* and 10*b*, the tape counter 219 also includes contact pieces 272, 273 and 274, which are made when all the drums 269 come to simultaneously display 9. The contact pieces 272, 273 and 274 constitute a switch, through which power is supplied.

Figures 11, 12:
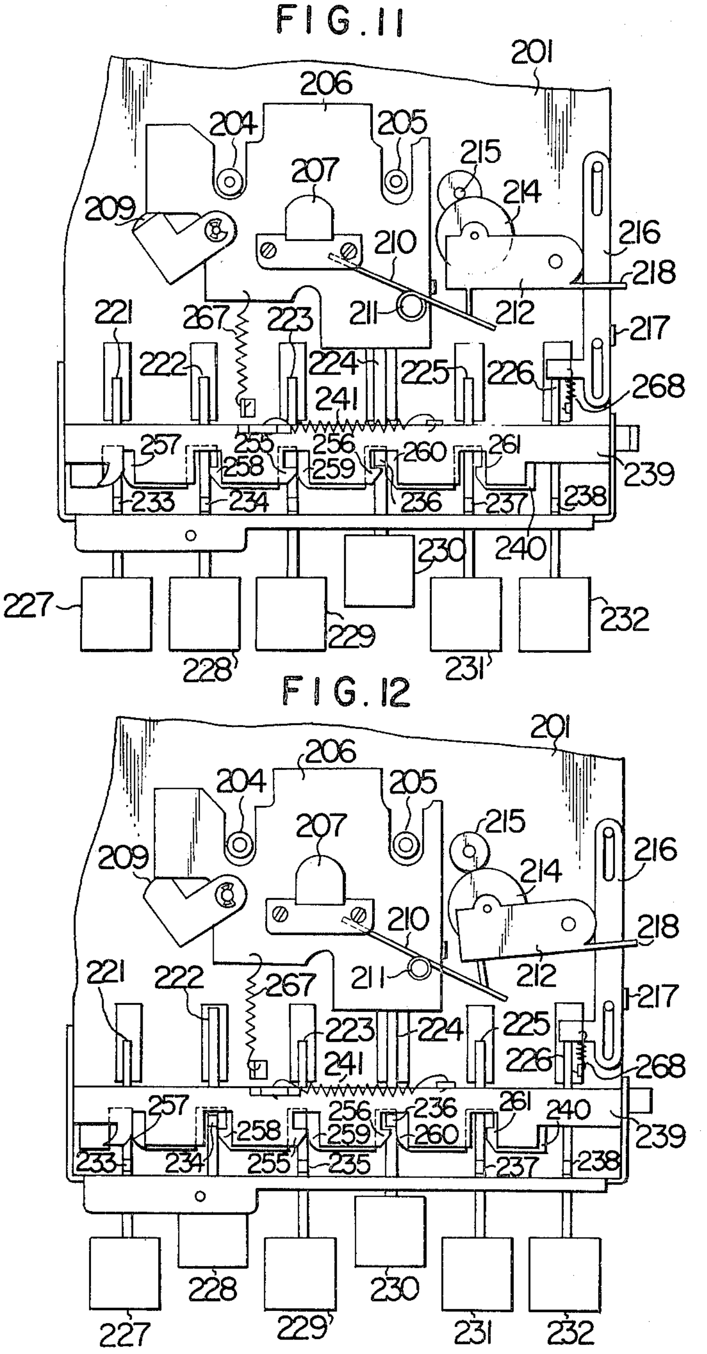

With the above construction, if the knob lever 224 is forwardly moved by pushing the playback knob 230, the protuberance 236 of the knob lever 224 exerts forces acting upon the hooking projection 256 of the slide member 239 and the projection 260 of the slide member 240 to displace the slide members 239 and 240 in opposite directions against the force of the spring 241, as shown in FIG. 11. Then, the slide member 239 is eventually released and returned to its initial position by the force of the spring 241, so that the protuberance 236 of the knob lever 224 is engaged by the hooking projection 256. In consequence, the knob lever 224 can no longer be returned to its initial position by its own returning spring (not shown), and it is locked in its advanced position. With the forward advancement of the knob lever 224 the head base 206 is also forwardly advanced by the knob lever 224. As a result, the head 207 is brought into contact with a tape (not shown), and also the tape is pinched by the pinch roller 214 against the capstan 215. In this state, the eraser head 209 assumes its position shown in FIG. 11 and is not in contact with the tape. The eraser head 209 is coupled to the recording knob lever 223, and it will not be brought into contact with the tape unless this recording knob lever 223 is forwardly advanced.

In the above away, when the knob lever 224 is forwardly advanced by pushing the playback knob 230, the tape is contacted by the recording and reproducing head 207 and pinched against the capstan 215 by the pinch roller 214, whereby playback can be started. The playback operation in this state can be switched over to rewind or fast feed operation by pushing the rewind knob 228 or fast feed knob 231. By so doing the knob lever 222 or 225 is advanced, whereupon a mechanism (not shown) coupled to the knob lever 222 or 225 is actuated to slightly rotate the pinch roller holder 212 in the counterclockwise direction against the force of the spring 210 so as to separate the pinch roller 214 from the capstan 215 for rewind or fast feed operation to be effected. Since the slide member 239 is provided with no projection or hooking projection corresponding to the protuberances 234 and 237 of the knob levers 222 and 225, with the advancement of the knob lever 222 or 225 at this time the slide member 239 is not displaced, so that the playback knob lever 224 remains locked by the hooking projection 256 of the slide member 239, with the slide member 240 remaining urged by the protuberance 236 of the knob lever 224. Consequently, the rewind or fast feed knob lever 222 or 225 is not engaged by the hooking projection 258 or 261 of the slide member 240. If the rewind or fast feed knob 228 or 231 is pushed after stopping the system, the protuberance 234 or 237 of the knob lever 222 or 225 is engaged by the hooking projection 258 or 261 of the slide member 240, so that the knob lever 222 or 225 will no longer be returned to the initial position by its own restoring spring (not shown). However, since the playback knob lever 224 is locked by the hooking projection 256 of the slide member 239, with the slide member 240 remaining urged by the protuberance 236 of the knob lever 224, the rewind or fast feed knob lever 222 or 225 is never locked by the hooking projection 258 or 261. Thus, by releasing the knob 228 or 231 the knob lever 222 or 225 is returned to its initial position by its own restoring spring (not shown). However, the rewind knob lever 222 will not be returned to its initial position for it is locked by the hooking projection 265 of the rotative lever 262 until the tape is rewound to a predetermined position as will be discussed hereinafter in detail.

As has been shown, according to the instant embodiment in the playback state the playback knob 230 will never be retreated by operating the rewind or fast feed knob 228 or 231, while by releasing the rewind or fast feed knob 228 or 231 it becomes ready to be retreated by its own retreating spring, and upon its retreatment the playback state is automatically brought about again. In the case of the fast feed knob 231, it is retreated immediately upon its releasing, whereupon the playback state is brought about again, as has been mentioned earlier. Also as mentioned earlier, in case of the rewind knob 228, since it is locked by the hooking projection 265 of the rotative lever 262, the rewind state continues until this locking is released, and upon releasing of this locking it is immediately retreated to bring about the playback state again.

Figures 13, 14:
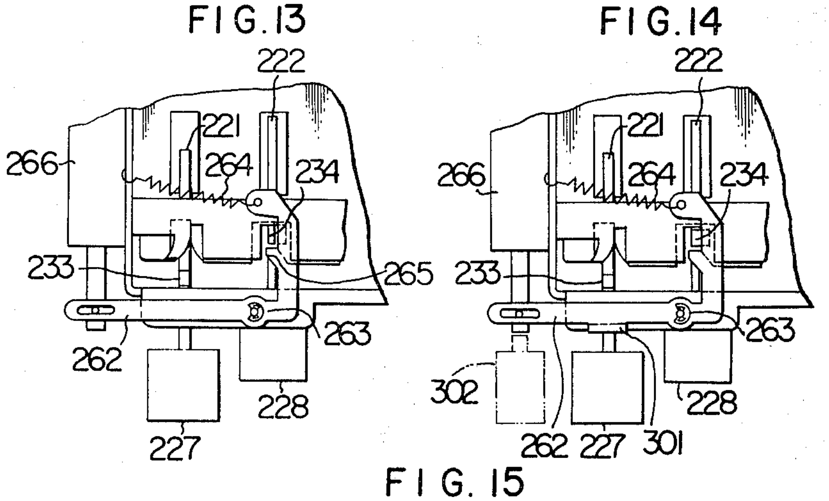

The function of bringing about the playback state again will now be discussed in further detail. Unless the rotative lever 262 is provided, as shown in FIG. 12, the rewind knob lever 222, like the fast feed knob lever 225, would be immediately returned to its initial position by its own returning spring (not shown). Where the rotative lever 262 is provided, as shown in FIG. 13, the protuberance 234 of the knob lever 222 is locked by the hooking projection 265 of the rotative lever 262. In this state, the knob lever 222 is not returned to its initial position by its own returning spring (not shown), and the rewind operation is continued. As the rewind operation continues, the display on the tape counter 219 coupled to the reel shaft 202 is progressively shifted to smaller values, and ultimately the display becomes zero. When the rewind operation is further continued, all the drums 269 of the tape counter 219 come up with the display figure 9, whereupon the contact piece 272 contacts the contact pieces 273 and 274. As a result, predetermined current is supplied through the contacts 272, 273 and 274 to the plunger 266, thus rotating the rotative lever 262 in the clockwise direction. Thus, the locking of the knob lever 222 by the hooking projection 265 of the rotative lever 262, so that the knob lever 222 is returned to its initial position by its own returning spring (not shown). From this moment the playback operation is resumed. After the playback operation is thus resumed, the display of the tape counter 219 is progressively shifted to greater values, so that the contact piece 272 is separated from the contact pieces 273 and 274, whereupon the rotative lever 262 is returned to its initial position by the force of the spring 241.

As has been shown, according to the invention the playback state with the playback knob 230 held in the advanced position may be switched over to the rewind state by pushing the rewind knob 228, and the rewind operation thus started continues until all the drums of the tape counter 219 come to display 9, whereupon the playback is automatically resumed. It will be noted that it is possible to set a desired position corresponding to the termination of the rewind operation by the zero resetting mechanism of the tape counter 219.

While the above discussion has been concerned with the case of switching the playback operation over to the rewind or fast feet operation, the recording operation can similarly be switched over to the rewind or fast feed operation. For obtaining the recording operation the recording knob 229 should be pushed simultaneously with the pushing of the playback knob 230. In this case, the slide members 239 and 240 are moved in the same way as when the sole playback knob 230 is pushed. This is because the shape of the notches 247, 246, 260 and 259 of the slide members 239 and 240 corresponding to the knob levers 224 and 223 are the same for both the slide members. Further, according to the instant embodiment the rewind or fast feed knob 228 or 231 may be operated when the system is stopped. In this case, the rewind or fast feed operation is continued until the stop knob 227 is operated. By pushing the rewind or fast feed knob 228 or 231 in the still state of the system, the protuberance 234 or 237 of the knob lever 222 or 225 urges the hooking projection 258 or 261 of the slide member 240 and eventually locked by the hooking projection 258 or 261. This locking is not released until the slide member 240 is again displaced against the force of the spring 241 by pushing the stop knob 227, and until which time the rewind or fast feed operation is continued.

When the knob lever 221 is forwardly moved by pushing the stop knob 227, the projections 254 and 257 of the slide members 239 and 240 are urged by the protuberance 233, so that the slide members 239 and 240 are displaced against the force of the spring 241 in opposite directions, thus releasing the locking of all the protuberances 234 to 237 by the respective hooking projections 255, 256, 258 and 261, so that all the advanced knobs 228 to 231 are returned to their initial position. However, the knob 228 will not be returned to the initial position unless the rotative lever 262 is simultaneously rotated in the clockwise direction to release the locking by the hooking projection 265 of the rotative lever 262. Accordingly, the rotative lever 262 is provided with a tongue not shown such that by pushing the knob 227 the tongue is urged by the knob 227 or the protuberance 233 of the knob lever 221 to thereby cause rotation of the rotative lever 262 in the clockwise direction. If the rotative lever 262 is coupled to the playback knob lever 224 such that with the forward movement of the playback knob lever 224 the rotative lever 262 is rotated in the clockwise direction so that the rewind knob lever 222 may not be locked by the hooking projection 265, the rotative lever 262 need not be coupled to the stop knob 227 or knob lever 221. With such construction, the hooking projection 265 of the rotative lever 262 can lock the protuberance 234 of the knob lever 222 only when the playback knob lever 224 is at the advanced position. Thus, with the releasing of the playback knob lever 224 the knob lever 222 is no longer locked by the hooking projection 240, so that it is possible to ensure the returning of the knob lever 222 with the action of the plunger 266 as mentioned earlier.

As has been made apparent, with the above embodiment, which is constructed such that when the rewind knob lever is advanced by pushing the rewind knob for switching the playback state over to the rewind state, the rewind knob lever is locked by the associated locking means operated by the plunger to start the rewind operation which is continued until the tape counter display reaches a predetermined value, whereupon the plunger is connected to a power source and actuates to release the locking of the rewind knob lever by the locking means, at the end of the predetermined rewinding the playback state can be automatically resumed, which is very advantageous when it is desired to repeat the playback of a certain position of the record. Also, the construction according to the invention is very simple, and it can be obtained by merely adding a separate switching means cooperating with the tape counter, the plunger operated by the switching means and the locking means operated by the plunger.

A still further embodiment of the magnetic recording and reproducing system according to the invention will now be discussed with reference to FIGS. 14 to 17. This embodiment is similar to the preceding embodiment of FIGS. 7 to 13 except that a function to release the locking of the lever 222 of the rewind knob 228 at the time of operating the stop knob 227 is imparted by providing the rotative lever 262 at a location thereof corresponding to the stop knob 227 with an engagement piece 301. With this construction, it is possible to release the rewind knob lever 222 when the locking of the lever 222 by the lever 262 is not released without the action of the plunger 266 such as when the rewind knob 228 is operated without operating the playback knob 230. Further, a knob 302 is provided to take the role of the engagement piece 301 for releasing the locking of the rewind knob lever 222 by the rotative lever 262. While operating the knob 227 causes the locking of the playback knob lever 224 to also be released, operating the knob 302 causes the rotative lever 262 alone to be operated. Thus, provided the playback knob 230 is at the advanced position the rewind state can be automatically switched over to the playback state by pushing the knob 302.

Figure 15:
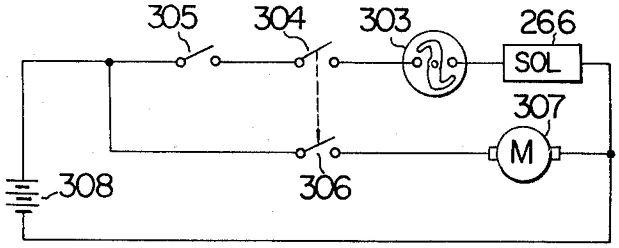
Figure 16:
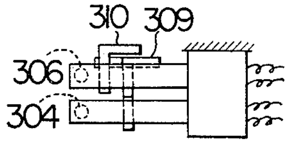
Figure 17:
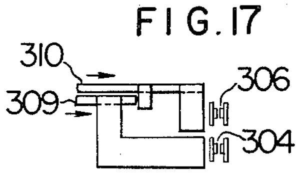

FIG. 15 shows the electric circuit in this embodiment. As is shown, the switch 303 consisting of contact pieces 272, 273 and 274 provided in the tape counter 219 is connected in series with a switch 304, which is closed only when the rewind knob lever 222 is in the advanced state, an automatic playback selection switch 305 and the solenoid of the plunger 266. This series circuit is connected in parallel with another series circuit consisting of a switch 306, which is closed simultaneously with the switch 304, and the motor 307, and the parallel circuit is connected across the power supply 308. As is shown in FIGS. 16 and 17, the switches 304 and 306 are respectively operated by a lever 309 co-operating with the rewind knob lever 222 and a lever 310 cooperating with the fast feed lever 225. Both the switches 304 and 306 are closed when the lever 309 is operated.

What we claim is:

1. A magnetic recording and reproducing system comprising:

first means for obtaining a playback operation and including a playback lever, second means for obtaining a rewind operation and including a rewind lever, third means for obtaining a fast feed operation and including a fast feed lever, fourth means for operating said means for obtaining the rewind or fast feet operation by interrupting the playback operation without restoring the playback lever with the driving of the rewind lever or fast feed lever, fifth means for manually or automatically restoring the rewind lever or fast feed lever for the purpose of resuming the playback operation by rendering the means for obtaining the rewind or fast feed operation inoperative, said fifth means comprising a first slidable lever having means for locking the rewind and fast feed levers in the operative state and a second slidable lever having means for locking the playback lever in the operative state, and means for deviating said first slidable lever in a direction not to lock said rewind and fast feed levers by said playback lever at the time of operation of the same.

2. The magnetic recording and reproducing system according to claim 1, wherein said fourth means includes a means for locking the rewind lever when the rewind lever is advanced by operating a rewind knob in the playback state of the system, and also wherein said fifth means, includes a tape counter and means for releasing the locking of the rewind lever upon reaching of a predetermined value of said counter, whereby the playback state may be automatically brought about again due to the releasing of the rewind lever by said releasing means.

3. The magnetic recording and reproducing system according to claim 2, wherein said locking means includes a rotatable locking lever spring biased in one direction, said locking lever being engageable with an engagement portion of the rewind lever, and also wherein said releasing means includes a releasing plunger having a movable member related to an end of an elongated portion of said locking lever, said plunger being actuated upon reaching of the predetermined value of the indication of the tape progress counter to release the locking of the rewind lever by the locking lever.

4. The magnetic recording and reproducing system according to claim 3, which further comprises an engagement knob lever to engage with an engagement portion provided on the elongated portion of said locking lever and operable to release the locking of the rewind lever by the locking lever upon actuation of said engagement knob.

5. The magnetic recording and reproducing system according to claim 3, which further comprises a releasing lever to cooperating with the locking lever to release the locking of the rewind lever by the locking lever.

6. The magnetic recording and reproducing system according to claim 2, wherein said fifth means has a switch adapted to be closed upon reaching of a predetermined value of the indication of the tape progress counter and a resetting mechanism for automatically bringing about the playback state from a desired tape position.

7. The magnetic recording and reproducing system according to claim 2, which further comprises an automatic playback selection switch, said releasing means being operable in the "on" state of said automatic playback selection switch, said means for obtaining the rewind operation being permitted to be operative until the tape is rewound up to the initial end thereof irrespective of the indication value of the tape progress counter in the "off" state of said automatic playback selection switch.

* * * * *